(12) United States Patent
Reddy (10) Patent No.: US 8,793,518 B2
(45) Date of Patent: Jul. 29, 2014

(54) SYSTEMS AND METHODS FOR PROVIDING SUPPLEMENTAL POWER TO BATTERY POWERED INFORMATION HANDLING SYSTEMS

(75) Inventor: Karunakar P. Reddy, Round Rock, TX (US)

(73) Assignee: Dell Products LP, Round Rock, TX (US)

( * ) Notice: Subject to any disclaimer, the term of this patent is extended or adjusted under 35 U.S.C. 154(b) by 300 days.

(21) Appl. No.: 13/495,631

(22) Filed: Jun. 13, 2012

(65) Prior Publication Data

US 2013/0339757 A1 Dec. 19, 2013

(51) Int. Cl.
*G06F 1/00* (2006.01)
*H02J 7/00* (2006.01)

(52) U.S. Cl.
USPC ............................ 713/300; 320/128; 320/132

(58) Field of Classification Search
USPC ......................................................... 713/300
See application file for complete search history.

(56) References Cited

U.S. PATENT DOCUMENTS

| | | | | |
|---|---|---|---|---|
| 3,673,485 | A * | 6/1972 | Vital et al. | 320/128 |
| 4,988,945 | A * | 1/1991 | Nagase | 324/175 |
| 6,060,789 | A * | 5/2000 | Yamaguchi | 307/66 |
| 6,538,344 | B1 * | 3/2003 | Yang et al. | 307/66 |
| 7,746,032 | B2 * | 6/2010 | Tupman et al. | 320/132 |
| 7,847,513 | B2 * | 12/2010 | Maier et al. | 320/101 |
| 8,129,947 | B2 * | 3/2012 | Chiasson et al. | 320/132 |
| 8,373,381 | B2 * | 2/2013 | Raiser et al. | 320/101 |
| 8,464,079 | B2 * | 6/2013 | Chueh et al. | 713/300 |

FOREIGN PATENT DOCUMENTS

JP 10126978 A * 5/1998

OTHER PUBLICATIONS

Kazuhisa Sato, Power Switching Circuit, May 15, 1998, JP 10126978A, English Translation.*
Texas Instruments, "1-4 Cell Li+Battery SMBus Charge Controller For Supporting Turbo Boost Mode With N-Channel Power MOSFET Selector", BQ24735, Sep. 2011, 42 pgs.

* cited by examiner

*Primary Examiner* — Suresh Suryawanshi
(74) *Attorney, Agent, or Firm* — Egan, Peterman & Enders LLP.

(57) ABSTRACT

Systems and methods are disclosed for providing supplemental power to a battery powered information handling systems. The disclosed systems and methods may be implemented to intelligently control the selected use of supplemental power so as to reduce or substantially prevent an increase in battery usage cycle count by only allowing use of supplemental power above a given minimum supplemental battery charge level threshold. Battery cycle count may be further enhanced by only again allowing recharging of the system battery pack when its charge level drops below the minimum supplemental battery charge level threshold, and then recharging to a maximum recharge battery charge level threshold which also may be selectable by a user and/or provider of the information handling system.

20 Claims, 5 Drawing Sheets

SYSTEMS AND METHODS FOR PROVIDING SUPPLEMENTAL POWER TO BATTERY POWERED INFORMATION HANDLING SYSTEMS

FIELD OF THE INVENTION

This invention relates generally to information handling systems, and more particularly to providing supplemental power to battery powered information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. These portable electronic devices are typically powered by rechargeable battery pack systems such as lithium ion ("Li-ion") or nickel metal hydride ("NiMH") battery packs. Notebook computers are often used with external AC power supplied by an AC adapter. Some central processing units (CPUs) now employed in notebook computers have high performance modes (e.g., Intel "Turbo-boost" mode) that allow the CPU to boost its power above the thermal design power (TDP) for a short period of time (e.g., from tens of milli-seconds to tens of seconds), causing system power requirements to exceed the AC adapter power rating for the notebook computer when certain high intensity processing conditions exist. This allows use of smaller capacity AC adapters sized only for total system loads that include CPU power modes that do not exceed the TDP. To address the need for additional system power beyond the AC adapter power rating during high intensity processing by the CPU, notebook battery packs have been employed to provide additional power when needed to supplement the AC adapter. "Supplemental power" (or "hybrid power") are terms used to describe the usage of a notebook battery pack as a supplemental energy source for the system when the system power requirements exceed the AC adapter power rating. The conventional approach is to implement this supplemental power in a manner that assumes that this battery-supplied power source of the battery pack is always available, and thus it can be tapped for use as supplemental power until the notebook battery pack is drained down to a substantially discharged state. Controllers are commercially available that implement conventional supplemental power or hybrid power modes for notebook computers.

Conventional supplemental and hybrid power modes tend to increase battery usage cycle count, reducing battery pack life over a period of time. Additionally, cross conduction needs to be monitored accurately in the battery pack firmware and system so that the battery pack is not shut down when reversing current. Moreover, it is possible that battery pack charge level may be reduced, or substantially drained, by a supplemental or hybrid power mode even though the notebook computer has been provided continuously with power from an AC adapter. This is undesirable from a user experience point of view.

SUMMARY OF THE INVENTION

Disclosed herein are systems and methods for providing supplemental power to battery powered information handling systems. The disclosed systems and methods may be implemented to intelligently control the selected use of supplemental power so as to reduce or substantially prevent an increase in battery usage cycle count by only allowing use of supplemental power above a given minimum supplemental battery charge level threshold, which in one exemplary embodiment may be selectable by a user and/or provider (e.g., manufacturer or assembler) of an information handling system. Moreover, in a further exemplary embodiment, battery cycle count may be further enhanced by only again allowing recharging of the system battery pack when its charge level drops below the minimum supplemental battery charge level threshold, and then recharging to a maximum recharge battery charge level threshold which also may be selectable by a user and/or provider (e.g., manufacturer or assembler) of the information handling system.

Thus, in one exemplary embodiment, a supplemental power mode may be enabled only above the minimum supplemental battery charge level threshold. In another exemplary embodiment, the minimum supplemental battery charge level threshold and/or maximum recharge battery charge level threshold may be user-selectable, e.g., by on screen GUI display during BIOS setup/and/or using other battery management software such as Dell Quickset. Advantageously, the disclosed systems and methods may be implemented using BIOS firmware and the embedded controller, thus minimizing impact to battery pack firmware and allowing for ease of cross platform applicability. Moreover, the disclosed systems and methods may be implemented with minimal impact to the system BIOS/embedded controller code.

In one exemplary embodiment, values of the minimum supplemental battery charge level threshold and the maximum recharge battery charge level threshold may be together set to minimize stress on a battery pack by minimizing or substantially eliminating the time during which battery discharging and recharging operations repeatedly occur in a near fully charged range (e.g., such as in a high stress region between 95% and 100% levels of battery pack charge). Such high battery stress conditions may exist, for example, when a battery powered information handling system is operated by a user with external AC adapter power provided to the information handling system on a continuous or near continuous basis. For example, by setting the minimum supplemental battery charge level threshold below 90% battery charge level (e.g., about 70%) and setting the maximum recharge battery charge level threshold below 100% battery charge level (e.g., about 95%), then battery discharging and recharging that occurs during a S0 power state may be limited to a selected region below the 95% charge level range. In a further embodiment, charging back to 100% charge level may be only allowed upon change to a S3, S4 or S5 power state. By only implementing supplemental power mode and minimum supplemental battery pack and maximum recharge battery charge levels when an AC adapter is providing power to the information handling system, a user may select and manage how battery pack power is used without sacrificing battery capacity when the AC adapter power is not available to the information handling system By employing defined thresholds to govern switching between battery charge and discharge for supplemental power, problems of cross conduction between the battery charge and discharge paths experienced with conventional supplemental power or hybrid power modes may be reduced or substantially eliminated by the disclosed systems and methods. Such cross conduction occurs with conventional systems due to a measurable delay to switch from battery charge mode to battery discharge mode at the same time that the current demand exceeds this delay. Moreover, for high performance modes such as Intel Dynamic Turbo-boost mode and peak power requirements, the additional conventional time delay required to switch from battery charge mode to battery discharge mode may miss the short duration peak current demand of a high performance mode. In contrast to conventional supplemental power modes, the disclosed systems and methods may implemented in one embodiment so that supplemental power is always available between the defined threshold limits and may be limited to a defined range (e.g., in one exemplary embodiment to the conditions of from about 100% to about 70% battery charge level) so that little or substantially no delay waiting for initiation of supplemental power may be experienced by a user due to the fast response time of the circuit. This is as compared to conventional supplemental power or hybrid power modes in which supplemental power initiation delays are often experienced when a CPU of a system requires supplemental power to meet higher processing demands.

In another exemplary embodiment, the disclosed systems and methods may be implemented in a manner that prevents draining of the system battery pack to undesirably low charge levels (e.g., including a fully depleted charge level) during lengthy high performance operations while the system is operating on external power supplied by an AC adapter. This may be accomplished, for example, by managing one or more maximum peak power levels provided during supplemental power operations, e.g., to within about an average of 5 Watt to about a 10 Watt peak, or other suitable defined peak power range selected for a given system load, battery pack size and/or corresponding AC adapter size. In such an embodiment, supplemental power levels may be so managed to minimize a duty cycle of the supplemental power draw (e.g., to less than about 10% in one embodiment). In this regard, when a selected minimum supplemental battery charge level threshold is reached, the supplemental power may be disabled to allow the system battery pack to charge to a selected maximum recharge battery charge level threshold, at which time the battery pack is again made available for providing supplemental power. In such an embodiment, the system battery pack may be only allowed to normally charge (e.g., to a full charge state) during system suspend or off states. In a further embodiment, AC adapter sizing may be further optimized to further minimize duty cycle impact.

In one respect, disclosed herein is a method for operating a battery powered information handling system, including providing a battery powered information handling system that itself includes: a system load, the system load including at least one first processing device that is configured to operate in first power mode having a first power consumption level and a separate second power mode having a second power consumption level, the second power consumption level being greater than the first power consumption level, a battery system including one or more battery cells, battery charger and power switching circuitry configured to receive current from an external power source and to selectably provide the received current to recharge the battery cells of the battery system, and to selectably power the system load from either one or both of the external power source or the battery system, the external power source having a maximum available power capacity that is equal to or greater than the total system load power requirement when the processing device is operating in the first power mode and is less than the total system load power requirement when the processing device is operating in the second power mode, and at least one second processing device coupled to control the battery charger and power switching circuitry to selectably enable a supplemental power mode to allow the first processing device to operate in the second power mode and the system load to be simultaneously powered from both the external power source and the battery system when the operating power mode of the first processing device is the second power mode, and to selectably disable the supplemental power mode to prevent the first processing device from operating in the second power mode and to only allow the system load to be powered by the external power source when the battery charger and power switching circuitry is receiving current from the external power source. The method may also include using the second processing device to control the battery charger and power switching circuitry while the first processing device is powered so as to only enable the supplemental power mode when each of the following two conditions exist at the same time: the battery charger and power switching circuitry is receiving current from the external power source, and the charge level of the battery cells of the battery system has a value above a given minimum supplemental battery charge level threshold, the minimum supplemental battery charge level having a value below the 100% charge level. The method may also include using the second processing device to control the battery charger and power switching circuitry while the first processing device is powered so as to disable the supplemental power mode and to provide received external current to recharge the battery cells of the battery system when the current charge level of the battery cells of the battery system has a value equal to or below the given minimum supplemental battery charge level threshold.

In another respect, disclosed herein is a battery powered information handling system, including: a system load, the system load including at least one first processing device that is configured to operate in first power mode having a first power consumption level and a separate second power mode having a second power consumption level, the second power consumption level being greater than the first power consumption level; a battery system including one or more battery cells; battery charger and power switching circuitry configured to receive current from an external power source and to selectably provide the received current to recharge the battery cells of the battery system, and to selectably power the system load from either one or both of the external power source or the battery system, the external power source having a maximum available power capacity that is equal to or greater than the total system load power requirement when the processing device is operating in the first power mode and is less than the total system load power requirement when the processing device is operating in the second power mode; and at least one second processing device coupled to control the battery charger and power switching circuitry to selectably enable a supplemental power mode to allow the first processing device to operate in the second power mode and the system load to be simultaneously powered from both the external power source and the battery system when the operating power mode of the first processing device is the second power mode, and to selectably disable the supplemental power mode to prevent the first processing device from operating in the second power mode and to only allow the system load to be powered by the external power source when the battery charger and power switching circuitry is receiving current from the external power source. The second processing device is configured to perform the following steps: a) control the battery charger and power switching circuitry while the first processing device is powered so as to only enable the supplemental power mode when each of the following two conditions exist at the same time: the battery charger and power switching circuitry is receiving current from the external power source, and the charge level of the battery cells of the battery system has a value above a given minimum supplemental battery charge level threshold, the minimum supplemental battery charge level having a value below the 100% charge level; and b) control the battery charger and power switching circuitry while the first processing device is powered so as to disable the supplemental power mode and to provide received external current to recharge the battery cells of the battery system when the current charge level of the battery cells of the battery system has a value equal to or below the given minimum supplemental battery charge level threshold.

DESCRIPTION OF ILLUSTRATIVE EMBODIMENTS

Figure 1:
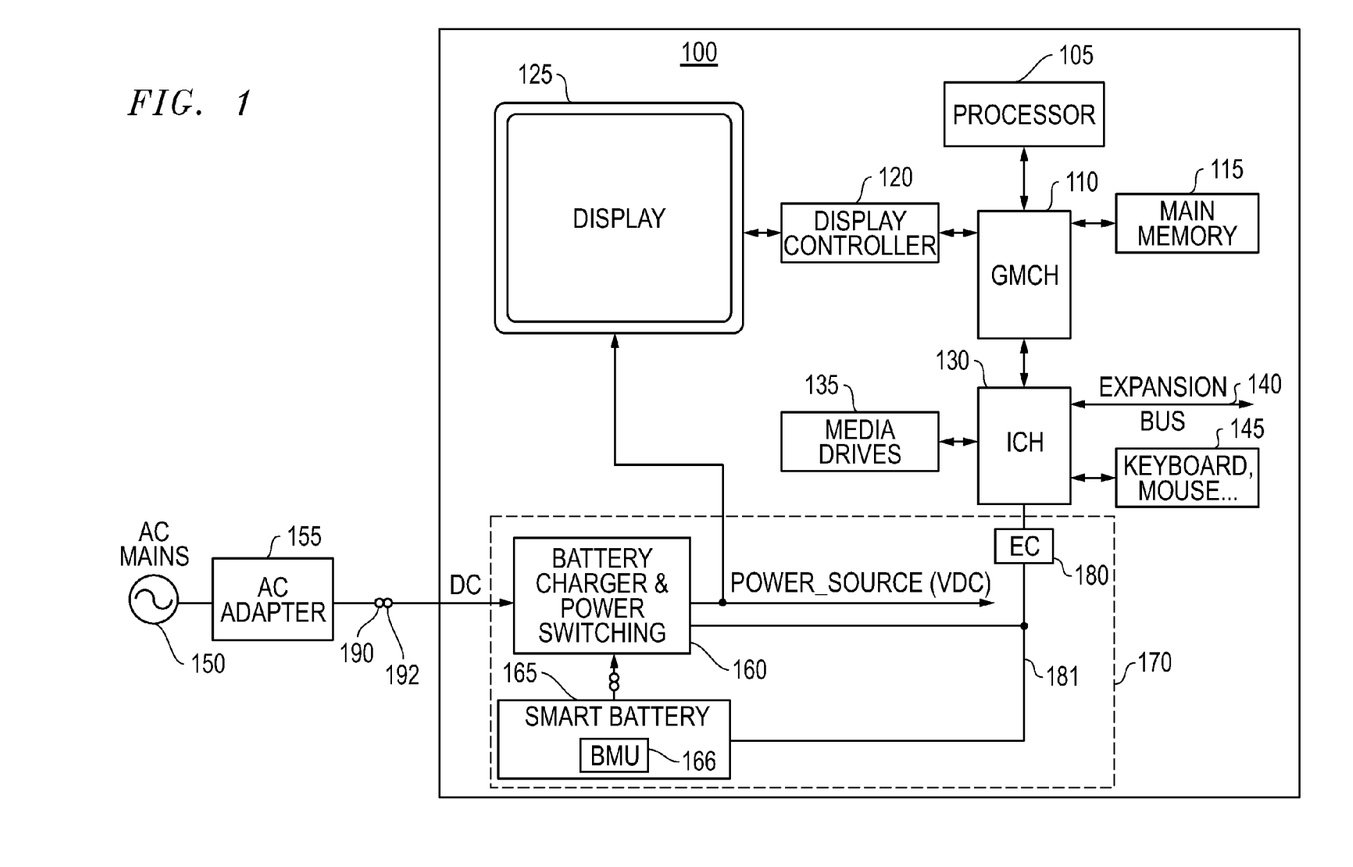
FIG. 1 is a block diagram illustrating an information handling system according to one exemplary embodiment of the disclosed systems and methods.
Figure 2:
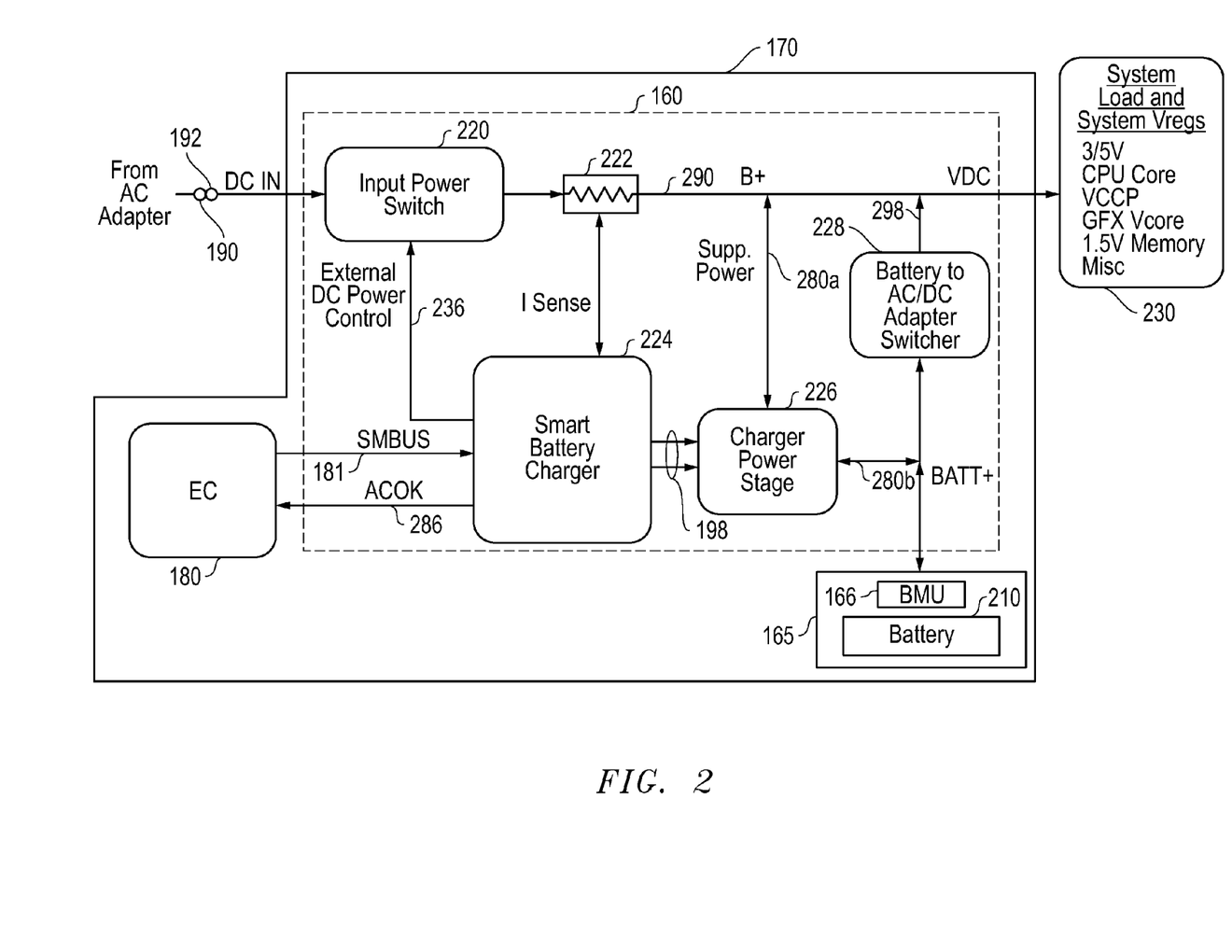
FIG. 2 is a block diagram illustrating switching and supplemental power control circuitry according to one exemplary embodiment of the disclosed systems and methods.

FIG. 1 is a block diagram of a battery powered information handling system 100 (e.g., portable information handling system such as notebook computer, MP3 player, personal data assistant (PDA), cell phone, cordless phone, etc.) as it may be configured according to one exemplary embodiment of the disclosed systems and methods. As shown in FIG. 2, information handling system 100 of this exemplary embodiment includes at least one processor 105 such as an Intel Pentium series processor, an Advanced Micro Devices (AMD) processor or other processor that is configured with multiple power modes that vary over time (e.g., with each of the power modes having a different required power level that corresponds to a different real time processing requirement). The multiple power modes of the processor/s 105 include at least one normal operating power mode that does not exceed the thermal design power (TDP) of CPU 105, and at least one temporary power mode that exceeds the TDP of the CPU 105, e.g., such as Intel "Turbo-boost" power mode.

Still referring to FIG. 1, a graphics/memory controller hub (GMCH) chip 110 is coupled to processor 105 to facilitate memory and display functions. System memory 115 and a display controller 120 are coupled to GMCH 110. A display device 125 (e.g., video monitor) may be coupled to display controller 120 to provide visual images (e.g., via graphical user interface) to the user. An I/O controller hub (ICH) chip 130 is coupled to GMCH chip 110 to facilitate input/output functions for the information handling system. Media drives 135 are coupled to ICH chip 130 to provide permanent storage to the information handling system. An expansion bus 140 is coupled to ICH chip 130 to provide the information handling system with additional plug-in functionality. Expansion bus 140 may be a PCI bus, PCI Express bus, SATA bus, USB or virtually any other expansion bus. User input devices 145 (e.g., such as a keyboard, mouse, touchpad, touchscreen, etc.) are coupled to ICH chip 130 to enable the user to interact with the information handling system. An embedded controller (EC) 180 running system BIOS is also coupled to ICH chip 130.

In this particular embodiment, information handling system 100 is coupled to an external source of power, namely AC mains 150 and AC adapter 155. It will be understood that externally sourced DC power may be alternatively provided from any other suitable external source (e.g., external DC power source) or that AC adapter 155 may alternatively be integrated within an information handling system 100 such that AC mains 150 supplies external AC power directly to information handling system 100 where AC power is converted to externally sourced DC power within information handling system 100. In any case, external AC adapter 155 (or alternatively internal AC adapter or an external DC power source) may be sized to have a power rating that is sufficient to meet the total anticipated power requirements of information handling system 100 when processor 105 is operating in a first lower power mode (e.g., normal operating mode that does not exceed the CPU TDP) of multi-power mode power processor/s 105, but that is insufficient to meet the total anticipated power requirements of information handling system 100 when processor 105 is operating in a second higher power mode (e.g., temporary high performance processing operating mode above the CPU TDP) of multi-power mode power processor/s 105. In such an embodiment, processor/s 105 may be configured to transition in real time between the first lower power mode and the second higher power mode, for example, in response to sensed real time processing requirements for current required or requested system operating tasks, and/or in response to user or system commands, etc.

As shown in FIG. 1, AC adapter 155 is removably coupled to, and separable from, battery charger and power switching circuitry 160 of information handling system 100 at mating interconnection terminals 190 and 192 in order to provide information handling system 100 with a source of DC power to supplement DC power provided by battery cells of a battery system in the form of smart battery pack 165, e.g., lithium ion ("Li-ion"), nickel metal hydride ("NiMH"), nickel cadmium (NiCd), or lithium-polymer (Li-polymer) battery pack including one or more rechargeable batteries and a BMU that includes an analog front end ("AFE") and microcontroller. Further, a battery system data bus (SMBus) 181 is coupled to smart battery pack 165 to provide battery state information, such as battery voltage, current and charge level information, from BMU 166 of smart battery pack 165 to embedded controller 180. Battery charger and power switching circuitry 160 of information handling system 100 may also provide DC power for recharging battery cells of the battery system 165 during charging operations.

When a battery system of a portable information handling system is optionally provided as a replaceable battery pack, it may be configured for insertion and removal from a corresponding battery pack compartment defined within the chassis of the information handling system (e.g., such as a notebook computer), and may be provided with external power and data connector terminals for contacting and making interconnection with mating power connector terminals and data connector terminals provided within the battery pack compartment to provide power to the system load of the information handling system and to exchange data with one or more processing devices of the information handling system.

As further illustrated in the exemplary embodiment of FIG. 1, battery charger and power switching circuitry 160, smart battery pack 165, and embedded controller 180 may together be configured as switching and supplemental power control circuitry 170. In this exemplary embodiment, switching and supplemental power control circuitry 170 may be configured to intelligently control the selected use of smart battery pack 165 as a supplemental energy source for system 100 when the system power requirements exceed the AC adapter power rating, e.g., such as when processor/s 105 transitions to a high performance processing mode that cause system power requirements to exceed the power rating of AC adapter 155 under certain high intensity processing conditions that may be required to meet current requested or required system operating tasks or in response to user or system command.

FIG. 2 illustrates one exemplary embodiment of switching and supplemental power control circuitry 170. In this embodiment, battery charger and power switching circuitry 160 includes input power switch circuitry 220 that is controlled by external DC power control signals 236 from smart battery charger circuitry 224 to selectively couple and decouple externally sourced DC power from input power path 290 and voltage regulation circuitry and power-consuming system load components 230 of system 100, e.g., including memory, processing and display components of FIG. 1. In this regard, smart battery charger circuitry 224 may selectively open and close input power switch circuitry 220 based on AC adapter size and capacity to charge the battery. In addition, the embedded controller 180 may check or determine the AC adapter identifier (ID) and decide if the input power switch circuitry 220 should be enabled or disabled based on the identity of the AC adapter. this embodiment, smart battery charger circuitry 224 may be further coupled to measure the level of external DC current provided by AC adapter 155 by monitoring voltage drop across sense resistor 222 as shown. The presence and/or value of external DC current from AC adapter 155 may be provided to embedded controller 180 across SMBus 181.

As described further herein, smart battery charger circuitry 224 may use real time measured external DC current value and dynamic power management (DPM) to prioritize use of external DC power for operating the system load of information handling system 100, and to determine how much power above the maximum available external DC power (e.g., maximum power rating of AC adapter 155) is available at any time for purposes of charging battery pack 165. Smart battery charger circuitry 224 may also determine when the maximum available external DC power and additional power from battery pack 165 is needed to supplement the external DC current to meet system load requirements. Smart battery charger circuitry 224 may include any combination of controller circuitry (e.g., such as BQ24735 Charge Controller available from Texas Instruments Inc. of Dallas Tex., controller circuits available from O2 Micro of the Cayman Islands, etc.) and voltage measurement circuitry that is suitable for performing the measurement and control tasks of smart battery charger circuitry 224 described herein.

Still referring to FIG. 2, smart battery charger circuitry 224 may also be coupled to provide control signals 198 for controlling charger power stage circuitry 226 to, among other things, regulate external DC power for input power path 290 to produce proper voltage charging current for charging battery cell/s 210 of smart battery pack 165 via bi-directional charger power path 280*a* and 280*b*. Smart battery charger circuitry 224 may also control charger power stage 226 to regulate flow of supplemental power via bi-directional charger power path 280*a* and 280*b* from smart battery pack 165 to input power path 290. As long as the total power requirement of the system load of information handling system 100 does not exceed available external DC power (e.g., the maximum power rating of the AC adapter 155), then smart battery charger circuitry 224 may control charger power stage 226 to provide any available excess external DC power via charger power path 280*a* and 280*b* to battery pack 165 for charging cells of battery 210 if needed. However, once the total power requirement of the system load of information handling system 100 equals or exceeds the available external DC power then then smart battery charger circuitry 224 may be configured to prevent any flow of current from input power path 290 to battery pack 165 across charger power path 280*a* and 280*b*.

In one embodiment, smart battery charger circuitry 224 may monitor real time level of external DC current provided by AC adapter 155 and system power drawn by monitoring voltage drop across sense resistor 222 to determine in real time when a multi-power mode processor 105 transitions to a high performance mode (e.g., a temporary high performance processing operating mode above the CPU TDP which causes the total power requirement of the system load to exceed the available external DC power 192 corresponding to the maximum power rating of the AC adapter 155). In this regard, the power budget for the information handling system 100 dictates what is the ideal AC adapter size supported for the platform. For example a QC CPU based system might require a 90 W adapter based on system power budget estimation. This would be the adapter size that would be considered as "supported AC adapter." It will also be understood that the smart battery charger circuitry 224 may determine in real time when a multi-power mode processor 105 transitions to a high performance mode in any other suitable manner, e.g., such as by receipt of an optional control signal from another circuit component or processing device of system 100.

During those times that external DC power is available (e.g., AC adapter 155 is active and supplying DC power to input power path 290), then battery to AC/DC adapter switch circuitry 228 is controlled by battery charger supplemental control circuit (the combination of smart battery charger 224, charger power stage circuitry 226 and current sense resistor 222) to be open so that no current is allowed to flow from battery pack 165 across battery power path 298 to input power path 290. When no external DC power is available (e.g., AC adapter 155 is inactive or disconnected from input power path 290), then battery to AC/DC adapter switch circuitry 228 is opened (controlled by the smart battery charger 224 and EC 180) to source power from the battery pack 165. Battery to AC Adapter switch circuitry 228 may include any combination off circuit components (e.g., MOSFET transistors or other suitable switching devices) suitable for selectively allowing full system operating power to be provided from battery pack 165 when no external DC power is present at input power path 290.

In the practice of the disclosed systems and methods, charger power stage 226 may include any combination of controllable switching and power regulation circuitry (e.g., MOSFET transistors, buck converter, boost converter, etc.) that is suitable for regulating bi-directional flow of battery charging current and supplemental power current between input power path 290 and smart battery pack 165 in response to control signals received from smart battery charger circuitry 224. In one exemplary embodiment, embedded controller 180 may execute BIOS firmware stored in attached embedded controller memory to produce commands across SMBus 181 that causes or otherwise controls how controller circuitry within smart battery charger circuitry 224 generates control signals 198 that cause charger power stage 226 to regulate flow of supplemental power across power path 180a and 180b, including the amount (if any) of current that is allowed to flow to supplement the external DC power simultaneously provided to input power path 290. In this regard, it will be understood that in one exemplary embodiment smart battery charger circuitry 224 may include separate controller intelligence configured to cause flow of supplemental power across power path 180a and 180b when system load requirements exceed maximum available external DC power (e.g., maximum power rating of AC adapter 155) subject to overriding control of embedded controller 180 (e.g., across SMBus 181). In this regard, embedded controller 180 may be configured to prevent smart battery charger circuitry 224 from allowing flow of supplemental power across power path 280a/280b at any time and/or may cause smart battery charger circuitry 224 to allow flow of supplemental power across power path 280a/280b at any time in a manner as described further herein. As further shown in FIG. 2, ACOK signal 286 may be provided as shown from smart battery charger circuitry 224 to embedded controller 180 for purposes of detecting that a valid size AD adapter is plugged into the system 100 and that the voltage seen is meeting the tolerance specifications of the adapter.

It will be understood that the embodiments of FIGS. 1 and 2 are exemplary only, and the disclosed systems and methods described herein may be implemented using any other configuration of one or more processing devices, switch circuitry, memory and battery resources that are suitable for intelligently and selectively providing power from one or more battery cells to supplement external DC power (e.g., such as provided by an external AC adapter) to power a system load of a battery powered information handling system that includes a processing device that is temporarily operating in a high power mode, e.g., such as an Intel processor operation in a Turbo-boost mode.

Figure 3:
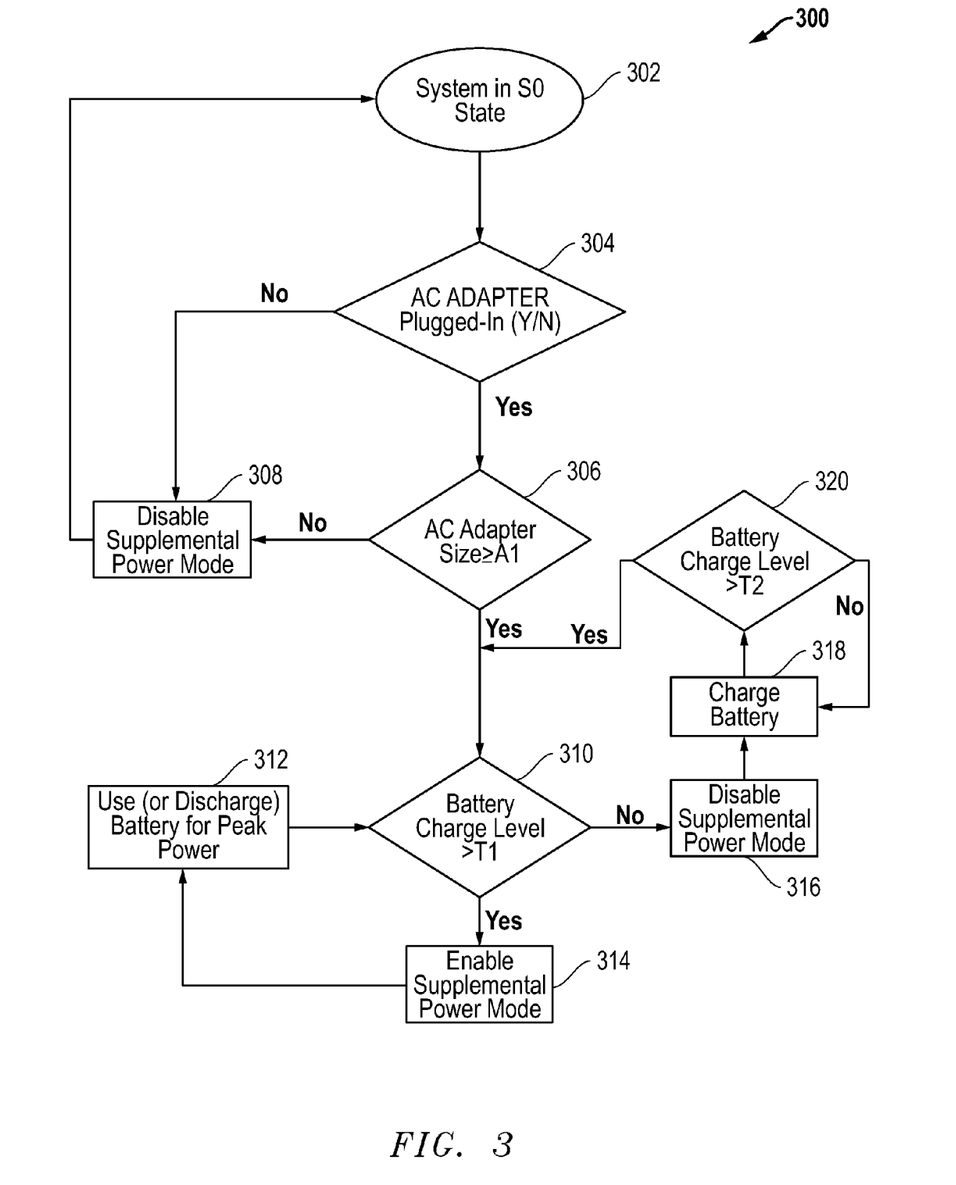
FIG. 3 illustrates methodology that may be implemented according to one exemplary embodiment of the disclosed systems and methods.

FIG. 3 illustrates one exemplary embodiment of a methodology 300 that may be implemented in the practice of the disclosed systems and methods. Methodology 300 may be optionally monitored and/or controlled by a user, e.g., using a graphical user interface "GUI" displayed on system display 125, and optionally controlled using user input devices 145 (e.g., to allow a user to selectively enable or disable methodology 300 and/or to change one or more of the battery charge threshold values described herein). Methodology 300 may be implemented, for example, by firmware executing on embedded controller 180 of information handling system 100 as described herein, it being understood that methodology 300 may be implemented using suitable processing device/s of a battery powered information handling system of any other suitable configuration.

In FIG. 3, the information handling system begins in step 302 in system S0 state, i.e., the information handling system 100 is fully operational with all system load circuit components 230 are operational as needed to fulfill system requirements, including at least one processor 105 having multiple power modes that include at least one normal operating power mode that does not exceed the thermal design power (TDP) of CPU 105, and at least one temporary supplemental power mode that exceeds the TDP of the CPU 105, e.g., such as Intel "Turbo-boost" power mode. As shown, methodology 300 proceeds to step 304 where it is first determined whether AC adapter 155 is powered up (e.g., plugged in to AC Mains 150) and actively supplying externally sourced DC power to information handling system 100. In one embodiment EC 180 may make this determination based on ACOK signal 286 from smart battery charger 224 that monitor current from AC adapter 155 via a current sense circuit in smart battery charger 224 that is configured to measure externally sourced DC current using current sense resistor 222.

If AC adapter 155 is determined to be not supplying current in step 304 of FIG. 3, then methodology 300 proceeds to step 308, where supplemental power mode is disabled, the information handling system operates on battery power and methodology 300 returns to step 302 and repeats. While supplemental power mode is disabled, no supplemental power is provided from battery system 165 to supplement externally sourced DC power, even if processing device/s 105 requests high power mode.

Still referring to FIG. 3, if in step 304 AC adapter 155 is determined to be powered up (e.g., plugged in to AC Mains 150) and actively supplying externally sourced DC power to information handling system 100, then methodology 300 proceeds to optional step 306 where the maximum power rating or size of an operational AC adapter 155 coupled to information handling system 100 is determined and compared to a minimum power threshold A1 for purpose of ensuring that sufficient AC adapter power is available for powering information handling system while processing device/s 105 are in supplemental power mode. In one exemplary embodiment, A1 may represent a minimum power rating corresponding to an AC adapter 155 that is rated for information handling system 100, e.g., worst case system power budget including estimation of worst case loading for the system including LCD, HDD, keyboard, LEDs, USB port, etc. If it is determined that the size of a coupled AC adapter 155 does not meet or exceed threshold A1, then methodology 300 proceeds to step 308 where supplemental power mode is disabled and methodology 300 returns to step 302 and repeats. At the same time, input power switch 220 may controlled by smart battery charger circuitry 224 to disconnect externally sourced DC power provided by the AC adapter, and only power from the battery pack 165 used to power the information handling system. However if it is determined in step 306 that the size of a coupled AC adapter 155 exceeds or equals pre-determined threshold A1, then methodology 300 proceeds to step 310.

In step 310 of methodology 300, it is determined if the current charge level of the cell/s 210 of battery pack 165 exceeds a pre-determined minimum supplemental battery charge level threshold (T1). Embedded controller 180 may make this determination, for example, based on battery charge level information available from BMU 166 of smart battery 165 via Smart Battery SMBus protocol. If the current charge level of the cell/s 210 of battery pack 165 does not exceed T1, then methodology proceeds to step 316 where supplemental power mode is disabled and methodology 300 proceeds to step 318 where battery cell/s 210 of battery pack 165 are charged in step 318 until it is determined in step 320 that the current charge level of the cell/s 210 of battery pack 165 have reached a pre-determined maximum recharge battery charge level threshold (T2) which is set to be a higher charge level value than T1. Once the current charge level of the cell/s 210 of battery pack 165 has reached a charge level of T2, then methodology 300 returns to step 310 as shown. It will be understood that values of T1 and T2 may be set and/or varied by a user (e.g., using a graphical user interface "GUI" displayed on system display 125 in combination with user input devices 145) as desired or needed to meet a particular application, as long as value of T2 is greater than value of T1 such that the charge level of battery pack 165 is maintained between the charge levels T1 and T2 when external power from AC adapter 155 is available and supplemental power mode is enabled. In one exemplary embodiment, a user may be enabled to select values of T1 and/or T2 from a menu presented to the user during BIOS setup, e.g., either selectable by a user from a presented list of possible preset values, user-selectable from a specific input value within a permissible range of values, or a user may be allowed to input any specific user defined value.

Although a value of minimum supplemental battery charge level threshold T1 may be any value suitable for a given application, exemplary possible specific values of T1 include values of about 70% charge level, about 80% charge level, or about 90% charge level. In another embodiment, T1 may be any value selected within a range of from about 70% to about 90% charge level, it being understood that values of T1 may be greater than about 90% or less than about 70% charge level. Similarly, a value of maximum (full) recharge battery charge level threshold T2 may be any value suitable for a given application that is greater than the selected corresponding T1. Exemplary values of T2 include, for example, about 100% charge level, about 95% charge level, any value between about 100% and about 95%, or a value less than about 95% but greater than the selected value of T1.

In one embodiment, by selecting the above-described combination of T1 and T2 charge values, supplemental power may be only enabled above a minimum T1 charge level value (e.g., preventing discharge of the battery pack 165 below an undesired level), and recharging of the battery pack 165 is only allowed to occur up to a maximum T2 charge level that is less than 100%. This acts in one exemplary embodiment to prevent cycling of the battery charge level within an undesirable high stress charge level region (e.g., prevents cycling within a high stress region of about 95% charge level to about 100% charge level) while external power from AC adapter 155 is available and supplemental power is periodically or randomly requested or otherwise required from battery pack 165. In another embodiment, the use of such T1 and T2 charge level threshold values also minimizes or substantially eliminates cross conduction and/or need to delay charge/discharge switching or enablement of supplemental power when needed. This is because T1 and T2 charge level values may be selected as described herein to prevent rapidly and repeatedly switching between battery pack charge and discharge modes while supplemental power is enabled, with no artificial switching delay being required to be implemented.

Another example of a possible value for minimum supplemental battery charge level threshold T1 is a 10% system threshold when the Battery power is too low to provide the Supplemental power mode to the system. In such a case, the supplemental battery power mode is turned off and the system charges the battery. Another example of a possible value of T2 charge level would be 100% Battery capacity. In such a case, the battery pack 165 may be utilized to provide the supplemental power till the lower threshold, in this case T1 is reached.

Figure 4:
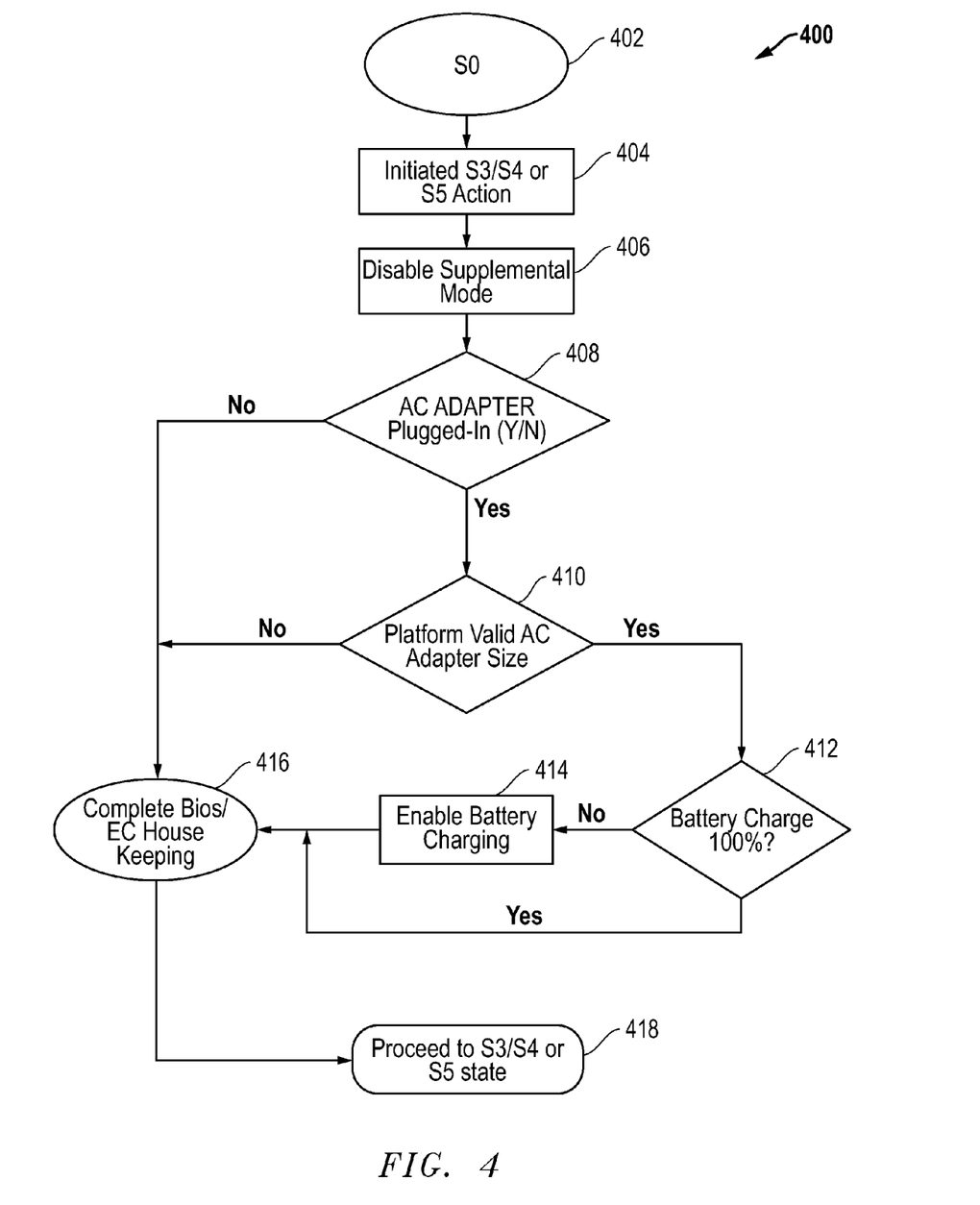
FIG. 4 illustrates methodology that may be implemented according to one exemplary embodiment of the disclosed systems and methods.

Still referring to FIG. 3, if in step 310 it is determined that the current charge level of the cell/s 210 of battery pack 165 exceeds minimum supplemental battery charge level threshold (T1), then supplemental power mode is enabled in step 314 as shown. Supplemental power mode continues to be enabled in step 312 as shown until current charge level of battery pack 165 no longer exceeds the minimum supplemental battery charge level threshold (T1) as shown. While supplemental power mode is enabled, supplemental power is made available as needed from battery system 165 to supplemental externally sourced DC power when processing device/s 105 requests high power mode FIG. 4 illustrates one exemplary embodiment of a methodology 400 that may be implemented in the practice of the disclosed systems and methods, e.g., on the same information handling system as methodology 300 is implemented, but when a system state is indicated (e.g., requested) that is other than the S0 state. As with methodology 300, methodology 400 may be implemented, for example, by firmware executing on embedded controller 180 of information handling system 100 as described herein, it being understood that methodology 400 may be implemented using suitable processing device/s of a battery powered information handling system of any other suitable configuration. Moreover, as with methodology 300, methodology 400 may be optionally monitored and/or controlled by a user, e.g., using a graphical user interface "GUI" displayed on system display 125, and optionally controlled using user input devices 145 (e.g., to allow a user to selectively enable or disable methodology 400 and/or to change one or more of the battery charge threshold values described herein).

In FIG. 4, the information handling system begins in step 402 in system S0 state, e.g., during which the system has been executing methodology 300 described above. In the system S0 state, the information handling system 100 is fully operational with all system load circuit components 230 operational as needed to fulfill system requirements, including processor/s 105. As shown in FIG. 4, methodology 400 proceeds to step 404 where another system state is initiated (e.g., based on user request or automatic system control signal) in which the processor/s 105 will be made inactive and de-powered at the same time embedded controller 180 and battery charger and power switching circuitry 160 each remain powered up. Examples of such power states include, but are not limited to, S3 "Sleep" state, S4 "Hibernation" state, and S5 "System Off" state. However, it will be understood that methodology 400 may be implemented upon initiation of any other system state where processor/s 105 are inactive and not powered while at the same time embedded controller 180 and battery charger and power switching circuitry 160 each remain powered. When the other system state is initiated in step 404, supplemental power mode is disabled in step 406 as shown.

Next, methodology 400 proceeds to step 408 where it is first determined whether AC adapter 155 is powered up (e.g., plugged in to AC Mains 150) and actively supplying externally sourced DC power to information handling system 100. If AC adapter 155 is found non-operational (e.g., unplugged or otherwise inactive), then methodology 400 proceeds to step 416, where BIOS and embedded controller housekeeping tasks (e.g., such as controlling thermals, system states—S3, S4, timers, reading keyboard & touchpad inputs apart from monitoring the Battery fuel gauge) are completed before proceeding in step 418 to complete the system change to the newly initiated system power state. However, if it is determined in step 408 that AC adapter 155 is powered up (e.g., plugged in to AC Mains 150) and actively supplying externally sourced DC power to information handling system 100, then methodology 400 proceeds to step 410 where it is determined whether the coupled AC adapter 155 is a valid AC power rating size for the platform of information handling system 100. In this embodiment, step 410 may be performed for purposes of confirming that the AC adapter plugged into the system matches the rated "supported AC adapter size" for the platform and is a valid manufacturer-approved AC adapter.

Still referring to the embodiment of FIG. 4, if it is determined in step 410 that the power rating size of the coupled AC adapter 155 is not valid, then methodology 400 moves to step 416 and proceeds therefrom in a manner as previously described. However, if in step 410 it is determined that the power rating size of the coupled AC adapter 155 is valid for platform 100, then methodology proceeds to step 412 where it is determined whether the current level of charge of smart battery pack 165 is equal to about 100%. If so, then methodology moves to step 416 and proceeds therefrom in a manner as previously described. However, if in step 412 it is determined that current level of charge of smart battery pack 165 is below about 100%, then battery pack 165 is charged in step 414 to a level of about 100% before methodology 400 proceeds to step 416 and therefrom. In this manner, when a valid sized AC adapter 155 is supplying power to information handling system 100, the initiated system power state of step 404 is not entered in step 418 until battery pack 165 is substantially charged to about 100%.

It will be understood that an embedded controller 180 may implement aspects of the embodiments via SMBus communication with the battery pack BMU 166, and monitoring the register set in the BMU 166 for the indicated Fuel Gauge levels. It will also be understood that the methodologies of FIGS. 3 and 4 are exemplary only, and that either methodology may be performed using greater, fewer, or alternative steps. Further, it will be understood that the disclosed methodologies may be implemented using one or more processors together with battery-powered information handling system configurations that differ from that illustrated in FIG. 1.

Figure 5:
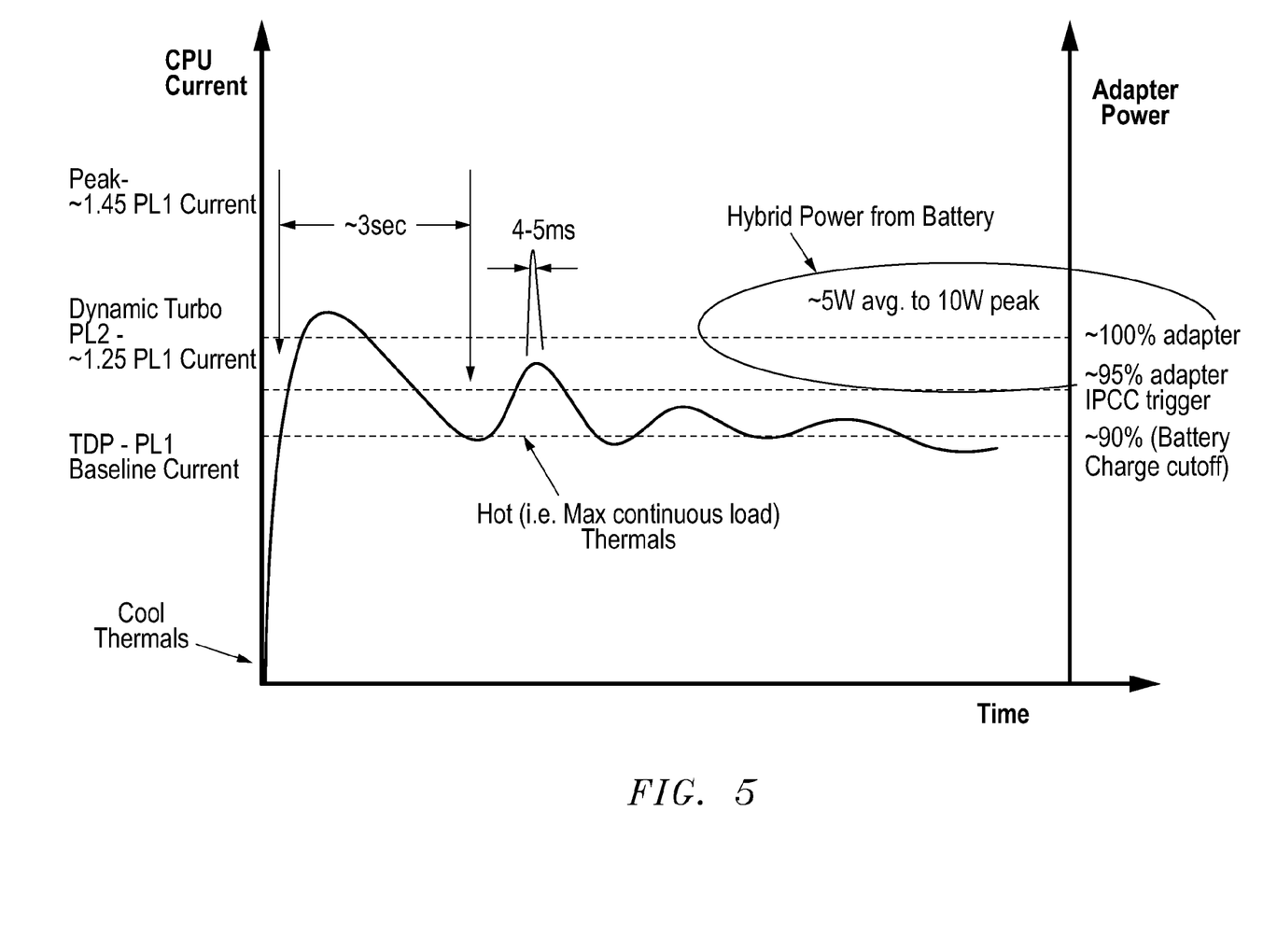
FIG. 5 illustrates a plot of CPU current and adapter power according to one exemplary embodiment of the disclosed systems and methods.

FIG. 5 illustrates one exemplary embodiment of impact on AC adapter 165 when methodologies 300 and 400 are implemented with information handling system 100 of FIG. 1. Specifically FIG. 5 illustrates how the platform power and AC adapter sizing is effected by the supplemental power mode, e.g., such as Dynamic Turbo Current demand from an Intel processor. In such case, supplemental or hybrid power is necessary now due to what is illustrated in this figure. A first trigger point is when 95% power draw from the AC adapter is measured by the EC 180 via the battery charge, referring to block 222 resistor methodology. Now the Power from battery pack 165 supplements the system power as supplemental power is enabled by methodology of the flowcharts in FIGS. 3 and 4. As soon as the power demand drops below 95% the battery pack 165 stops sourcing power and stays idle till the next high power event comes along.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will also be understood that one or more of the tasks, functions, or methodologies described herein (e.g., for BMU 166, EC 180, smart battery charger 224, processor 105 or other suitable processing device) may be implemented, for example, as firmware or other computer program of instructions embodied in a non-transitory tangible computer readable medium that is executed by a CPU, controller, microcontroller, processor, microprocessor, FPGA, ASIC, or other suitable processing device. Further, although replaceable smart battery packs are described in relation to some of the embodiments herein, it will be understood that the disclosed systems and methods may be implemented with battery systems that are non-replaceable and/or with battery systems controlled by external processing device/s.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for operating a battery powered information handling system, comprising:
   a) providing a battery powered information handling system including:
      a system load, the system load comprising at least one first processing device that is configured to operate in first power mode having a first power consumption level and a separate second power mode having a second power consumption level, the second power consumption level being greater than the first power consumption level,
      a battery system including one or more battery cells,
      battery charger and power switching circuitry configured to receive current from an external power source and to selectably provide the received current to recharge the battery cells of the battery system, and to selectably power the system load from either one or both of the external power source or the battery system, the external power source having a maximum available power capacity that is equal to or greater than the total system load power requirement when the processing device is operating in the first power mode and is less than the total system load power requirement when the processing device is operating in the second power mode, and
      at least one second processing device coupled to control the battery charger and power switching circuitry to selectably enable a supplemental power mode to allow the first processing device to operate in the second power mode and the system load to be simultaneously powered from both the external power source and the battery system when the operating power mode of the first processing device is the second power mode, and to selectably disable the supplemental power mode to prevent the first processing device from operating in the second power mode and to only allow the system load to be powered by the external power source when the battery charger and power switching circuitry is receiving current from the external power source;

b) using the second processing device to control the battery charger and power switching circuitry while the first processing device is powered so as to only enable the supplemental power mode when each of the following two conditions exist at the same time:

the battery charger and power switching circuitry is receiving current from the external power source, and the charge level of the battery cells of the battery system has a value above a given minimum supplemental battery charge level threshold, the minimum supplemental battery charge level having a value below the 100% charge level; and c) using the second processing device to control the battery charger and power switching circuitry while the first processing device is powered so as to disable the supplemental power mode and to provide received external current to recharge the battery cells of the battery system when the current charge level of the battery cells of the battery system has a value equal to or below the given minimum supplemental battery charge level threshold.

2. The method of claim 1, further comprising using the second processing device to monitor for each of: the presence of external power provided to battery charger and power switching circuitry, the charge level of the battery cells of the battery system, and the power mode of the first processing device.

3. The method of claim 1, where step c) further comprises continuing to use the second processing device to disable the supplemental power mode and to control the battery charger and power switching circuitry to provide received external current to recharge the battery cells of the battery system until the charge level of the battery cells of the battery system reaches a value that is equal to a maximum recharge battery charge level threshold that is greater than the supplemental battery charge level threshold; and then while the first processing device remains powered repeating step b) after the charge level of the battery cells of the battery system reaches a value that is equal to the maximum recharge battery charge level threshold.

4. The method of claim 3, further comprising providing at least one user input device coupled to provide user input to the second processing device; and using the second processing device to accept input from a user to define the value of at least one of the minimum supplemental battery charge level threshold, the maximum recharge battery charge level threshold, or both.

5. The method of claim 3, further comprising performing step b) before step c) every time that the first processing device enters a powered operating state from a de-powered non-operating state; and then iteratively performing steps b) and c) for so long as the first processing device remains continuously powered thereafter in the operating state.

6. The method of claim 3, further comprising performing step b) before step c) every time that the information handling system enters a S0 system power state from a system power state in which the first processing device is not powered.

7. The method of claim 1, further comprising performing steps b) and c) while the information handling system is operating in a S0 power state; and performing the following steps before allowing the information handling system to change from the S0 system power state to any one of a S3, S4 or S5 system power state while the battery charger and power switching circuitry is receiving current from the external power source:

d) using the second processing device to control the battery charger and power switching circuitry to disable the supplemental power mode; and e) using the second processing device to control the battery charger and power switching circuitry to substantially fully charge the battery cells of the battery system.

8. The method of claim 1, where the minimum supplemental battery charge level threshold has a value of from about 70% to about 90%.

9. The method of claim 8, where the maximum recharge battery charge level threshold has a value less than 100% and greater than the value of the minimum supplemental battery charge level threshold.

10. The method of claim 9, where the maximum recharge battery charge level threshold has a value of less than or equal to about 95% and greater than the value of the minimum supplemental battery charge level threshold.

11. A battery powered information handling system, comprising:

a system load, the system load comprising at least one first processing device that is configured to operate in first power mode having a first power consumption level and a separate second power mode having a second power consumption level, the second power consumption level being greater than the first power consumption level;

a battery system including one or more battery cells;

battery charger and power switching circuitry configured to receive current from an external power source and to selectably provide the received current to recharge the battery cells of the battery system, and to selectably power the system load from either one or both of the external power source or the battery system, the external power source having a maximum available power capacity that is equal to or greater than the total system load power requirement when the processing device is operating in the first power mode and is less than the total system load power requirement when the processing device is operating in the second power mode; and at least one second processing device coupled to control the battery charger and power switching circuitry to selectably enable a supplemental power mode to allow the first processing device to operate in the second power mode and the system load to be simultaneously powered from both the external power source and the battery system when the operating power mode of the first processing device is the second power mode, and to selectably disable the supplemental power mode to prevent the first processing device from operating in the second power mode and to only allow the system load to be powered by the external power source when the battery charger and power switching circuitry is receiving current from the external power source;

where the second processing device is configured to perform the following steps:

a) control the battery charger and power switching circuitry while the first processing device is powered so as to only enable the supplemental power mode when each of the following two conditions exist at the same time: the battery charger and power switching circuitry is receiving current from the external power source, and the charge level of the battery cells of the battery system has a value above a given minimum supplemental battery charge level threshold, the minimum supplemental battery charge level having a value below the 100% charge level; and b) control the battery charger and power switching circuitry while the first processing device is powered so as to disable the supplemental power mode and to provide received external current to recharge the battery cells of the battery system when the current charge level of the battery cells of the battery system has a value equal to or below the given minimum supplemental battery charge level threshold.

12. The system of claim 11, where the second processing device is configured to monitor for each of: the presence of external power provided to battery charger and power switching circuitry, the charge level of the battery cells of the battery system, and the power mode of the first processing device.

13. The system of claim 11, where the second processing device is further configured to:

perform step c) by continuing to use the second processing device to disable the supplemental power mode and to control the battery charger and power switching circuitry to provide received external current to recharge the battery cells of the battery system until the charge level of the battery cells of the battery system reaches a value that is equal to a maximum recharge battery charge level threshold that is greater than the supplemental battery charge level threshold; and then while the first processing device remains powered to repeat step b) after the charge level of the battery cells of the battery system reaches a value that is equal to the maximum recharge battery charge level threshold.

14. The system of claim 13, further comprising at least one user input device coupled to provide user input to the second processing device; and where the second processing device is configured to accept input from a user to define the value of at least one of the minimum supplemental battery charge level threshold, the maximum recharge battery charge level threshold, or both.

15. The system of claim 13, where the second processing device is further configured to perform step b) before step c) every time that the first processing device enters a powered operating state from a de-powered non-operating state; and then to iteratively perform steps b) and c) for so long as the first processing device remains continuously powered thereafter in the operating state.

16. The system of claim 13, where the second processing device is further configured to perform step b) before step c) every time that the information handling system enters a S0 system power state from a system power state in which the first processing device is not powered.

17. The system of claim 11, where the second processing device is further configured to perform steps b) and c) while the information handling system is operating in a S0 power state; and where the second processing device is further configured to perform the following steps before allowing the information handling system to change from the S0 system power state to any one of a S3, S4 or S5 system power state while the battery charger and power switching circuitry is receiving current from the external power source:

d) controlling the battery charger and power switching circuitry to disable the supplemental power mode; and e) controlling the battery charger and power switching circuitry to substantially fully charge the battery cells of the battery system.

18. The system of claim 11, where the minimum supplemental battery charge level threshold has a value of from about 70% to about 90%.

19. The system of claim 18, where the maximum recharge battery charge level threshold has a value less than 100% and greater than the value of the minimum supplemental battery charge level threshold.

20. The system of claim 19, where the maximum recharge battery charge level threshold has a value of less than or equal to about 95% and greater than the value of the minimum supplemental battery charge level threshold.

* * * * *